United States Patent Office 3,700,448

Patented Oct. 24, 1972

3,700,448

DISPROPORTIONATING IMAGEWISE DISTRIBUTION OF METALLIC NUCLEI TO FORM VISIBLE METALLIC IMAGE

Peter John Hillson, London, and Michael Ridgway, Aldbury, Tring, Herts, England, assignors to Eastman Kodak Company, Rochester, N.Y.

No Drawing. Filed July 29, 1969, Ser. No. 845,885
Int. Cl. G03c 5/24
U.S. Cl. 96—48 R 9 Claims

ABSTRACT OF THE DISCLOSURE

Processes, and elements for use therewith, are described in which images are developed by the disproportionation of a metal compound in the presence of an imagewise distribution of nuclei which accelerate the disproportionation of the metal compound.

This invention relates to the formation of metallic images. In a particular aspect it relates to processes for forming a metallic image by a disproportionation reaction and to photosensitive compositions and elements for use in such processes.

Disproportionation has been previously employed in the preparation of images by photographic processes. For example, in U.S. Pat. 2,764,484 and British patent specification 737,874 a process is described in which the disproportionation of a mercurous compound is utilized in preparing a latent image which acts as a center for deposition of metal from conventional physical developers. Thus, in this process the disproportionation reaction is utilized to prepare a latent mercury image which is amplified by reduction and deposition of a different metal from a physical developer. To the best of our knowledge, systems have not been described where the latent image is developed by means of disproportionation of the metal compound from which the latent image is formed.

It has now been found that images can be formed by disproportionation of certain metal compounds, wherein the disproportionation reaction is catalyzed by nuclei formed with the metal compound. With the present invention, photographic images can be prepared from metal compounds which previously have not been considered sufficiently sensitive to light to make their use in photosensitive system practical.

It is an object of this invention to provide novel processes for the preparation of metallic images.

It is a further object of this invention to provide novel processes in which an image is developed by the disproportionation of a metal compound.

It is yet a further object of this invention to provide novel photographic processes in which a latent image is formed with a metal compound and developed by the disproportionation of that metal compound.

It is another object of this invention to provide novel photosensitive emulsions and elements with which metallic images can be prepared by disproportionation.

The above and other objects of this invention will become apparent to those skilled in the art from the further description of the invention which follows.

The novel elements of this invention comprise a support bearing a layer of a photosensitive, disproportionatable compound of a metal in a low equivalent oxidation state. Images are prepared therewith by a process in which an imagewise distribution of nuclei is formed in the layer of disproportionatable metal compound and is developed by treatment with a liquid in which the metal compound, in the presence of nuclei, will disproportionate, thereby forming a visible metallic image. In a preferred embodiment of the invention the nuclei are formed by exposing the layer to actinic radiation.

By the term "compound of a metal in a low equivalent oxidation state" we mean a compound wherein the metal is in a true low oxidation state or wherein the metal is in an apparent low oxidation state. An example of an apparent low oxidation state would be where the compound is a solution of the metal in a compound thereof of an oxidation state higher than the apparent oxidation state.

By the term "nuclei" we mean centers which accelerate or catalyze the disproportionation reaction. The nuclei can be formed by exposure formed by exposure to actinic radiation either before or during development, or they can be formed by application of other forms of energy, or by chemical fogging.

Disproportionation is a chemical reaction whereby a compound of a metal in a low equivalent oxidation state is converted to the elemental metal and a compound thereof in a higher oxidation state. An example of such a reaction can be represented by the following equation:

$$2M^+X^- \rightleftharpoons M^\circ + M^{++}X^-_2$$

wherein $M^+$ is the metal ion in a low equivalent oxidation state; $X^-$ is an anion; $M^\circ$ is the elemental metal; and $M^{++}$ is the metal ion in a higher oxidation state. The formation of the metal $M^\circ$ constitutes the formation of a new phase, and the reaction proceeds more rapidly in the presence of nuclei of the metal.

To be useful in this invention the metal compound should be disproportionatable, i.e., it should be capable of disproportionating. Such compounds can be prepared from one of the lower oxidation states of metals which have at least two positive true or apparent oxidation states where the ions of the metal in that lower oxidation state are not stable in solution, but where stable insoluble or covalent compounds of the metal in that lower oxidation state exist. Preferably, the metal is in its lowest positive oxidation state. Suitable disproportionatable metal compounds include oxides and halides of such metals as copper, indium, bismuth, tellurium, mercury, and the like, such as cuprous oxide, indium monohalide (e.g., indium monochloride, indium monobromide, indium monoiodide), bismuth subhalide (e.g., bismuth subchloride, bismuth subbromide, bismuth subiodide), tellurium (II) halide (e.g., tellurium (II) bromide, tellurium (II) chloride, tellurium (II) chlorobromide, tellurium (II) iodobromide), mercurous halide (e.g., mercurous iodide, mercurous chloride, mercurous bromide), and the like.

The developer or processing liquid should be chosen so that the compound of the metal in a low equivalent oxidation state is unstable therein and disproportionates in the presence of nuclei, but is sufficiently stable that, in the absence of nuclei, it will not disproportionate, or will not disproportionate as rapidly. Suitable developer or processing liquids can be chosen from such compounds as water, aqueous solutions of bases such as sodium hydroxide, aqueous solutions of mineral acids such as sulfuric acid, sulfurous acid, nitric acid, phosphoric acid, phosphorous acid, hypophosphorous acid, toluene sulfonic acid, etc., solutions of organic carboxylic acids such as acetic acid ethylenediamine tetraacetic acid, citric acid, formic acid, tartaric acid, picric acid, etc., organic liquids such as ketones (e.g., acetone), alkanols (e.g., ethanol, isopropanol), ethers (e.g., ethyl ether), cyclic hydrocarbons (e.g., xylene), chlorinated hydrocarbons (e.g., chloroform), as well as mixtures of such liquids.

Elements useful in the practice of the invention comprise a support bearing a layer of a photosensitive disproportionatable compound of a metal in a low equivalent oxidation state. The support can be any of the known photographic supports and include such materials as fiber base materials such as paper, polymer-coated paper (e.g., polyethylene-coated paper, polypropylene-coated paper), parchment, cloth, etc.; glass ceramic materials; synthetic polymeric materials such as polyalkyl methacrylates (e.g., polymethyl methacrylate), polyester film base (e.g., polyethylene terephthalate), polyvinyl acetals, polyamides (e.g., nylon), cellulose ester film base (e.g., cellulose nitrate, cellulose acetate, cellulose acetate propionate, cellulose acetate butyrate); and the like.

The metal compound can be carried on the support either with or without a binder. If a binder is employed, it should be permeable to the developer or processing liquid. Suitable binders include gelatin such as bone gelatin, pigskin gelatin, phthalated gelatin, deionized gelatin, etc.; olefinic polymers such as polyvinyl alcohol, polyvinyl phthalates, polyvinyl acetates, polyvinyl benzoates, polyvinyl anthranilates, etc.; cellulose derivatives such as carboxymethyl cellulose, cellulose ether phthalates, cellulose ether succinates, cellulose ether malonates, etc.; and the like. The metal compound can be preformed and admixed with the binder prior to coating or the metal compound can be formed in the binder by reaction of suitable compounds in a solution of the binder in a manner analogous to that employed in the preparation of silver halide emulsions.

In a preferred embodiment of this invention an element containing a layer of a photosensitive, disproportionatable compound of a metal in a low equivalent oxidation state is imagewise exposed to actinic radiation to form therein an imagewise distribution of nuclei which accelerate the further disproportionation of the metal compound upon treatment with a suitable developer liquid. Since the nuclei formed on photoexposure are generally short-lived species, and re-combine with other products of photoexposure to reform the original metal compound shortly after removal of the exposing radiation, it is often necessary, and is generally preferred, to expose the metal compound in contact with the developer or processing liquid. This permits the disproportionation reaction to proceed to a sufficient extent to make negligible the destruction of some nuclei through re-combination with other photoreaction products.

Photosensitive elements of the present invention are sensitive to ultraviolet and visible radiation, and certain of them are sensitive to *x*-radiation. Light sources. rich in such radiation should be employed in exposing the photosensitive elements. Suitable exposure sources include tungsten lamps, xenon lamps, carbon arc lamps, quartz iodide lamps, and the like. Exposure times of from several seconds to several minutes or longer are generally sufficient to give a developable latent image. Generally, when the element is exposed in contact with the developer or processing liquid, shorter exposure times are employed than when the element is contacted with the developer or processing liquid subsequent to exposure. Exposure times as short as a fraction of a second can give a developable latent image when the element is exposed in contact with the developer liquid.

The exposed element is developed by contacting it with the developer or processing liquid, for example, by dipping it in a bath of the processing liquid or by wetting the surface of the element with the processing liquid, such as by spraying. Moist air and other vapors can be employed to provide the processing liquid. The time of development can vary from several seconds to several minutes or longer and will depend upon such factors as the particular metal compound and particular developer being employed, the concentration of the developer liquid, the amount of exposure which the metal compound has received, etc. Development should be terminated before a significant amount of metal compound in non-exposed areas starts to disproportionate. Where the element is exposed in contact with the developer liquid, exposure can be stopped before development of an image is completed.

With certain of the metal compounds and certain of the developers of this invention, the action of the developer upon the unexposed metal compound results in a phenomenon termed passivation whereby the photosensitivity of the unexposed metal compound is reduced. It should be mentioned that with such combinations of metal compound and developer, when exposure is performed in the presence of a developer, it should take place shortly after the element is contacted with the developer so as to avoid increasing exposure as a result of the decrease in photosensitivity. With other combinations of metal compound and developer fixing is necessary if a permanent metal image is desired. This can be accomplished by removing residual metal compound from the element, by converting the unexposed metal compound to a stable non-photosensitive compound, or by transferring material from either exposed or unexposed areas of the element to a receiving sheet whereat it is reduced to form a metal pattern.

There follows a description of particular embodiments of the present invention. These embodiments are exemplary of photosensitive systems which can be utilized in photographic reproduction employing the present invention.

In one embodiment of the present invention the photosensitive, disproportionatable compound of a metal in a low equivalent oxidation state is cuprous oxide, $Cu_2O$, wherein copper has a true oxidation state of +1. Cuprous oxide can be prepared by reducing an alkaline solution of a cupric salt, such as cupric sulfate, in the presence of a complexing agent for cupric ions such as sodium potassium tartrate (Rochelle salt), with a reducing agent such as glucose in the presence of a peptizing agent, such as urea, which controls the grain size of the cuprous oxide. The cuprous oxide can be collected and dispersed in a hydrophilic colloid to form a coating composition, or a hydrophilic colloid, such as gelatin, can be added to the neutralized reaction mixture in which the cuprous oxide is prepared and the colloid coagulated, collected and washed. Coating aids, and similar photographic addenda, can be added to the emulsion, after which it is coated on a photographic support.

Preferred developer or processing liquids for use with cuprous oxide elements are dilute aqueous solutions of strong acids, except those which give insoluble cuprous salts (e.g., hydrochloric acid, hydrobromic acid, hydroiodic acid), or those which form soluble cuprous complexes (e.g., maleic acid). Representative strong acids include mineral acids, such as sulfuric acid, sulfurous acid, phosphoric acid, phosphorous acid, hypophosphorous acid, nitric acid, o-toluene sulfonic acid, etc., and organic carboxylic acids such as acetic acid, citric acid, formic acid, tartaric acid, picric acid, etc. When solutions of strong acids are employed as the developer, a phenomenon termed passivation is observed. On continued contact with the developer the photosensitivity of the cuprous oxide is reduced until it is no longer photosensitive. Thus, when strong acids are employed as developers, fixing of the exposed, developed element is not necessary. However, if exposure time is to be reduced by exposure of the element in contact with the developer, the exposure should be made within several seconds of the element being wetted by the developer.

Among the other developers which can be employed with cuprous oxide emulsions are reducing agents such as sodium dithioniate, vanadium trichloride, and hydrazine hydrate. When a cuprous oxide emulsion is exposed in contact with one of these developers, a copper image forms more rapidly in the exposed areas than in the unexposed areas. The rate of disproportionation of cuprous oxide in unexposed areas can be further retarded if a compound such as potassium iodide is added to the developer solution.

In a second embodiment of this invention the photosensitive, disproportionatable compound of a metal in a low equivalent oxidation state is an indium monohalide such as indium monochloride, indium monobromide, or indium monoiodide. Indium monohalide can be prepared by prior art procedures in which indium metal is heated with stoichiometric amounts of mercuric halides or indium di- or tri-halides in an evacuated vessel. This procedure yields a fused mass which must be carefully ground to obtain a coatable material and to prevent reduction to the indium metal.

A novel procedure for the preparation of indium monohalides, which permits control of grain size and avoids the need for grinding the indium monohalide, comprises the reduction of a solution of an indium trihalide in an alkanol, such as ethanol, with a reducing agent such as an amine borane reducing agent (e.g., tertiary-butylamine borane). The reduction reaction is preferably performed at elevated temperatures up to about 70° C. If temperatures much above 75° C. are employed, the indium trihalide often is reduced to elemental indium metal. It is preferable to add a hydrophilic colloid, such as hydroxypropyl cellulose, to the reaction mixture so as to restrict the growth of the crystals of the indium monohalide to dimensions suitable for photographic use. A coating composition can be prepared by adding a hydrophilic colloid such as deionized gelatin to the reaction mixture.

A useful developer or processing liquid for indium monohalides is water. The rate of development can be reduced by dilution of the water with an inert solvent such as acetone. This is often desirable when the indium monohalide is one which disproportionates very rapidly, such as indium chloride. Alternatively, the rate of development can be accelerated by making the developer slightly acidic when an indium halide, such as indium iodide, is employed which disproportionates less rapidly.

In another embodiment of this invention the photosensitive disproportionatable compound of a metal in a low equivalent oxidation state is a bismuth subhalide. It is known that when bismuth and bismuth trichloride are fused in an evacuated vessel, black substances are formed which have been described as bismuth subchlorides. It is not known with certainty whether the bismuth present in the subchloride is in a true low oxidation state or whether it is a solid solution of bismuth in bismuth trichloride. Therefore, the low equivalent oxidation state of the bismuth in bismuth subchloride may be a true low oxidation state or it may be an apparent low oxidation state. Nevertheless, when exposed to actinic radiation in the presence of a suitable solvent, the bismuth subchloride disproportionates to metallic bismuth and bismuth trichloride. The preferred bismuth subchloride for use in the invention is one in which the bismuth has an equivalent oxidation state of +2.

A preferred developer solvent for use with bismuth subchlorides is acetone. Exposure of an element containing a bismuth subchloride layer in contact with acetone yields a gray-metallic bismuth image on a black bismuth subchloride background. Visible discrimination of this image can be improved by contacting the acetone-moistened element with an absorbent receiving sheet, such as a paper receiving sheet, to transfer the disproportionation product, bismuth trichloride, from image areas of the element to the receiving sheet, whereat it is reduced with a suitable reducing agent, such as hydrazine hydrate, to metallic bismuth.

In yet other embodiments of the present invention the photosensitive disproportionatable compounds of metals in a low equivalent oxidation state are tellurium (II) halides such as tellurium (II) bromide, tellurium (II) chloride, tellurium (II) iodide, tellurium (II) chlorobromide, tellurium (II) chloroiodide, etc., and mercurous halides such as mercurous chloride, mercurous bromide, mercurous iodide, etc. These compounds can be prepared by procedures known to those skilled in the art, and photosensitive elements can be prepared from them by procedures previously described. Developer liquids which are useful with tellurium (II) halides are organic ketones such as acetone, alkanols, such as ethanol, ethers such as ethyl ether, cyclic hydrocarbons such as xylene and halogenated hydrocarbons such as chloroform. Developer liquids which are useful with mercurous halides include solutions of strong acids and acid salts such as nitric acid, the sodium salt of ethylenediaminetetraacetic acid, and solutions of strong bases, such as sodium hydroxide.

The following examples further illustrate the practice of this invention.

EXAMPLE 1

240 cc. of a solution containing 138 grams of Rochelle salt (sodium potassium tartrate) and 40 grams of caustic soda is mixed with 120 cc. of a solution containing 25 grams of cupric sulphate and 20 cc. of a 10% solution of gum acacia. The whole is heated to 60° C. and 100 cc. of a solution containing 54 grams of dextrose is added. The mixture is held at 60° C., with stirring, for 3½ minutes. 60 cc. of solution containing 13.2 cc. of concentrated sulphuric acid is added and the mixture cooled rapidly. While it is cooling, 120 cc. of a 10% solution of phthalated gelatin is added. The phthalated gelatin coagulates rapidly taking the cuprous oxide out of solution and the supernatent liquor is decanted off. The coagulated gelatin is redispersed in 200 cc. of a 10% solution of inert gelatin and the pH of the dispersion adjusted to 7.1. The resultant dispersion is coated on film base. Strips of the film are immersed in each of the processing liquids listed in Table I below, exposed through a step wedge for 5 seconds to a 25 watt bulb at 6 inches and developed by inspection under illumination from a Wratten 1A safelight. An image is formed in exposed areas. The photographic sensitivity of the system is as good as contact printing paper.

TABLE I

| Compound: | Concentration |
|---|---|
| Sulphuric acid | 2 N–0.25 N. |
| Hypophosphorous acid | 25%–1.6%. |
| Phosphorous acid | 2.5 M–1.25 M. |
| Nitric acid | 2.5 N–0.6 N. |
| Citric acid | 4 M. |
| Acetic acid | Above 1 N. |
| o-Toluenesulphonic acid | 2 M–0.25 M. |

EXAMPLE 2

Half of a film prepared as described in Example 1 is exposed for 1 minute to a No. 1 photoflood bulb at 6 inches while the other half is covered up. On immersing the film in a solution of 5% hypophosphorous acid and 0.5% maleic anhydride, an image develops in exposed areas of the film.

EXAMPLE 3

The procedure of Example 2 is followed with the exception that the processing liquid is an aqueous solution containing 4% sulphuric acid, 1% hypophosphorous acid and 1% maleic anhydride. Similar results are obtained.

EXAMPLE 4

A coating prepared as described in Example 1 is immersed in a fresh 10% aqueous solution of sodium dithionite and exposed to an electronic flash. An image becomes visible very rapidly. When 1% potassium iodide is added to the dithionite solution the image appears less rapidly.

EXAMPLE 5

The procedure of Example 4 is followed substituting (a) hydrazine hydrate diluted with water (1:2) and (b) 5% aqueous vanadium trichloride for the dithionite solution. An image is produced in each case.

EXAMPLE 6

Indium halides are prepared according to the method described in "Inorganic Synthesis," J. Kleinberg, vol. 7, p. 18, McGraw-Hill, New York, 1963. 0.05 mole of sliced indium metal is mixed with 0.025 mole of mercuric bromide, placed in a sealed, evacuated (0.005 mm. mercury pressure) vessel and heated in a furnace to 250° C. The temperature is held at this value for 1 hour and then raised to 350° C. to distill off the mercury. The melt is allowed to cool under a Wratten 1A safelight, and is ground to a powder with a pestle and mortar. It is necessary to grind the indium bromide with care, since continuous grinding, as in a ball mill, decomposes it giving metallic indium. The powdered halide is spread on the sticky side of sticky tape. When exposed to a xenon are for 1 minute the indium bromide element can be developed in water in a few minutes (2 to 20 minutes). Development is greatly accelerated if the water is made slightly (ca. M/100) acid. The material is much more sensitive if exposed under the developer. Then, one second exposure is sufficient to give a developable image and development proceeded more rapidly.

EXAMPLE 7

Indium chloride is prepared by substituting mercuric chloride for mercuric bromide in the procedure described in Example 6. An element prepared as in Example 6 behaves similarly except that development is much more rapid. In a solution of 1 to 2% water in acetone, development of the indium chloride element proceeds at a more controllable rate which is still more rapid than the development of the indium bromide element in pure water.

EXAMPLE 8

When the layer of indium bromide used in Example 6 is made moist, exposed and allowed to dry after the image is formed the disproportionating reaction reverses on drying. When the layer is washed with water the trivalent indium halide is lost and the image is stabilized.

EXAMPLE 9

The indium bromide powder used in Example 6 is dispersed in a 10% gelatin solution at pH 7 and coated and dried without marked decomposition. The resultant coating is light sensitive and an image may be formed therein, by exposure and development as described in Example 6.

EXAMPLE 10

0.75 gram of t-butylamineborane is dissolved in a mixture of 10 cc. of 1 molar indium tribromide in ethanol and 2 cc. of 3% Klucel C (hydroxypropylcellulose) in ethanol. The solution is heated to 60° C. for 5 minutes. Bubbles of gas escape from the solution, which remains clear for about 2 minutes and then turns bright orange as the indium monobromide is formed. 10 cc. of distilled water is added, followed by 10 cc. of a 10% solution of deionized gelatin at pH 7. The solutions are mixed thoroughly and coated on film base at a wet thickness of $^6/_{1,000}$ inch. The coated film contains a mixture of orange-red and white crystals. On washing the coated layer in water for 1 minute in the dark, the white crystals are converted to orange indium monobromide which is stable on drying. The coated film is exposed and developed as described in Example 6. Similar results are obtained.

EXAMPLE 11

The procedure of Example 10 is followed except that 1.2 gram of t-butylamineborane is used. Reduction to indium monobromide is more complete and washing has a smaller effect.

EXAMPLE 12

The procedure of Example 10 is followed except that 2 grams of t-butylamineborane is used. Reduction to indium monobromide is nearly complete and washing has a smaller effect than in Example 11.

EXAMPLE 13

Bismuth and bismuth trichloride are fused together in a sealed evacuated tube in order to obtain the molar ratio Bi:Cl:1:2. The black material resulting is ground to a powder in a pestle and mortar. The powder is rubbed into the surface of an unglazed earthenware plate and covered with acetone. The plate is then exposed through a 0.9 density step wedge to a xenon arc at 3 feet for 10 seconds. The step-wedge is removed at the end of the exposure and the layer left under the acetone for a further 30 seconds. The supernatent acetone is poured off, the plate dried in a current of dry air and the image protected from the air with a varnish. Despite poor visual discrimination between the black "subchloride" and grey metallic bismuth two steps are visible.

EXAMPLE 14

The procedure of Example 13 is followed except that the powder is exposed dry for 1 minute to a xenon arc at a distance of a few inches, and placed in acetone for 1 minute afterwards. An image is produced.

EXAMPLE 15

A plate is prepared as in Example 13, the powder is moistened with acetone and one-half of the powder is shielded from exposure with black paper. Then the powder is exposed for 10 seconds in Example 13. After exposure the powder is covered with chamois leather moistened with acetone. After 1 minute the chamois leather is removed and the trivalent bismuth chloride, which has been transferred to the leather imagewise, is revealed by reduction with hydrazine hydrate. Alternatively, the transferred image can be revealed by hydrolysis to insoluble basic chloride (BiOCl) or to bismuth hydroxide.

EXAMPLE 16

Compound A (bromide)

A compound is prepared by refluxing powdered tellurium with bromide for 6 hours before boiling off the excess bromine. The resultant yellow powder is collected and weighed, showing a 98% yield calculated as $TeBr_4$. This compound is called compound A.

Compound B (chloride)

Another compound is prepared by passing chlorine over molten tellurium. The resultant white powder is collected. This compound is called compound B.

Compound C (iodide)

Another compound is prepared by adding molten iodine to 0.802 gram tellurium powder in a test tube in a silicone oil bath at 160/180° C. and holding until little iodine vapor is visible. The grey/black contents of the tube weighed 4.290 grams, 107% calculated as $TeI_4$. 2.460 grams compound A are fused in a test tube with 0.70 gram tellurium powder, the molten contents, are poured into a mortar where they cool to a black crystalline mass. This is readily powdered to give a yellow/grey powder which is spread on yellow adhesive tape. When this element is moistened with acetone, ethanol, ether, isopropanol, xylene or chloroform, and exposed to a 1 k.w. xenon arc at a few inches for 10 seconds, an image develops. When the dry element is exposed for one minute little or no image is visible, but treatment with ether yields a visible image.

EXAMPLE 17

0.242 gram tellurium, 0.421 gram compound A and 0.254 gram compound B are fused and powdered as in Example 16 giving a black substance which gives an image on being exposed wet with ether as described in Example 16.

EXAMPLE 18

0.266 gram tellurium, 0.459 gram compound A and 0.511 gram compound C are fused in a test tube, and powdered as in Example 16. The resulting black powder is spread on yellow adhesive tape. Some print out occurs on exposure for one minute to the xenon arc and the image is intensified by treatment with ether. On exposure wet with ether, an image is visible after 10 seconds.

EXAMPLE 19

A mercurous iodide emulsion is made in the following way. 100 ml. of a 3.17% aqueous solution of potassium iodide is dropped slowly, with stirring, into 100 ml. of 2% nitric acid containing 5 grams mercurous nitrate. The precipitate of mercurous iodide is washed four times with distilled water by decantation. The precipitate is then dispersed in 100 ml. of a solution of 10% gelatin by stirring at 50° C. for 30 minutes. The resulting emulsion is coated on film base at a wet thickness of $\frac{6}{1000}$ inch and dried. All operations are carried out under illumination from a "Wratten" 1A safelight. A strip of the coated emulsion is exposed for 10 seconds to a photoflood lamp and immersed in solutions of caustic soda. With concentrations of caustic soda from 0.004 molar to 0.1 molar, a black image develops. At concentrations greater than 0.1 molar, the unexposed areas fog.

EXAMPLE 20

The procedure of Example 19 is repeated except that the element is immersed in solutions of the sodium salt of ethylene-diaminetetraacetic acid. Images develop in 10% and 1% solutions of the salt, but not in a 0.1% solution.

EXAMPLE 21

An element prepared as in Example 19 is immersed in a solution of dilute (3 N) nitric acid and exposed to a xenon arc for 10 seconds. A black image develops.

EXAMPLE 22

A mercurous bromide emulsion is made in the same way as the mercurous iodide in Example 19, except that the 3.17% potassium iodide solution is replaced by a 2.27% aqueous solution of potassium bromide. The emulsion is coated as in Example 19 and the element is immersed in a 0.004 molar solution of caustic soda and exposed 10 seconds in a photoflood lamp. A black image develops with some fog. At high concentrations, the caustic soda fogs the element. An unfogged image is obtained when the strip is immersed in 0.02 molar caustic soda that is saturated with potassium bromide and is then exposed to a photoflood lamp for 10 seconds.

The invention has been described in detail with particular reference to preferred embodiments thereof, but it will be understood that variations and modifications can be effected within the spirit and scope of the invention.

What is claimed is:

1. A process for forming a visible metallic image which comprises the steps of (a) forming an imagewise distribution of metallic nuclei in a photosensitive layer comprising a disproportionatable metal compound selected from the group consisting of cuprous oxide, indium monohalides, bismuth subhalides, tellurium (II) halides and mercurous halides, and (b) contacting said layer with a processing liquid in which said metal compound undergoes disproportionation more rapidly in the presence of said metallic nuclei than in the absence thereof.

2. A process as set forth in claim 1, wherein said imagewise distribution of metallic nuclei is formed by exposing said photosensitive layer to actinic radiation to thereby disproportionate said metal compound.

3. A process as defined in claim 2, wherein exposure of the disproportionatable metal compound is performed while the metal compound is in contact with the processing liquid.

4. A process as defined in claim 1, further comprising the step of fixing the visible image.

5. A process as defined in claim 1, wherein the disproportionatable metal compound is cuprous oxide and the processing liquid is a solution of a strong acid.

6. A process as defined in claim 1, wherein the disproportionatable metal compound is an indium monohalide and the processing liquid is water.

7. A process as defined in claim 1, wherein the disproportionatable metal compound is a bismuth subhalide and the developer liquid is acetone.

8. A process as defined in claim 1, wherein the disproportionatable metal compound is a tellurium (II) halide and the processing liquid is an organic liquid selected from the group consisting of ketones, alkanols, ethers, cyclic hydrocarbons, and halogenated hydrocarbons.

9. A process as defined in claim 1, wherein the disproportionatable metal compound is a mercurous halide and the processing liquid is a solution of a strong acid or a strong base.

References Cited

UNITED STATES PATENTS

| | | | |
|---|---|---|---|
| 2,095,839 | 10/1937 | Sheppard et al. | 96—48 |
| 1,934,451 | 11/1933 | Sheppard et al. | 96—88 |
| 2,862,815 | 12/1958 | Sugarman, Jr. et al. | 96—1.5 |
| 3,130,052 | 4/1964 | Dippel et al. | 96—88 X |
| 3,207,602 | 9/1965 | Shely | 96—88 X |
| 2,515,938 | 7/1950 | Stookey | 96—88 X |

FOREIGN PATENTS

| | | | |
|---|---|---|---|
| 215,754 | 10/1957 | Australia | 96—48 |

OTHER REFERENCES

Kosar: Light-Sensitive System, pp. 14–15 (1966).
Chem. Abstracts, vol. 54, 1960, p. 5218e.

NORMAN G. TORCHIN, Primary Examiner
W. H. LOUIE, JR., Assistant Examiner

U.C. Cl. X.R.

96—88 R; 252—501